United States Patent [19]
Takao et al.

[11] Patent Number: 5,938,311
[45] Date of Patent: Aug. 17, 1999

[54] HALF MIRROR DISPLAY DEVICE FOR INSTRUMENTS WITH IMPROVED ILLUMINATION SYSTEM

[75] Inventors: Kouichi Takao; Noriaki Ohta, both of Shimada, Japan

[73] Assignee: Yazaki Corporation, Tokyo, Japan

[21] Appl. No.: 08/997,991

[22] Filed: Dec. 24, 1997

[30] Foreign Application Priority Data

Dec. 24, 1996 [JP] Japan .................................. 8-343628

[51] Int. Cl.$^6$ .............................................. G01D 11/28
[52] U.S. Cl. ............................. 362/26; 362/30; 362/31; 116/287
[58] Field of Search ................................... 116/286, 287, 116/288, DIG. 36; 362/23, 26–31

[56] References Cited

U.S. PATENT DOCUMENTS

| | | | |
|---|---|---|---|
| 2,681,997 | 6/1954 | Ballard | 116/286 |
| 3,262,224 | 7/1966 | Hardesty | 116/286 |
| 4,233,927 | 11/1980 | Oikawa et al. | 116/287 |
| 5,410,454 | 4/1995 | Murase et al. | 362/31 |
| 5,821,867 | 10/1998 | Angell et al. | 362/23 |

FOREIGN PATENT DOCUMENTS 4-137325   12/1992   Japan .

*Primary Examiner*—Alan Cariaso
*Attorney, Agent, or Firm*—Oblon, Spivak, McClelland, Maier & Neustadt, P.C.

[57] ABSTRACT

A figure defining system (39, 43, 46, 57) defines a first figure as a pointer (43) on a background plate (39) and a second figure as a character plate (46) with characters and divisions, a figure illuminating system (39a, 43a, 47, 49, 55a, 51, 53) includes a rear light transmitting plate (47) for illuminating the pointer (43) as a figure element of the first figure to be visible, the rear light transmitting plate extending along a first plane, a top light transmitting plate (49) for illuminating the characters and divisions as figure elements of the second figure to be visible, the second light transmitting plate extending along a second plane crossing the first plane, and a common light source (51) disposed in a corner chamber partially defined by an end face of the rear light transmitting plate and an end face of the top light transmitting plate, and a half mirror (41) arranged between the first and second planes for displaying a combination of an optical image of the first figure, as it is transmitted through the half mirror, and an optical image of the second figure, as it is reflected on the half mirror, to have images of the figure elements combined to be visible in a display field.

6 Claims, 4 Drawing Sheets

HALF MIRROR DISPLAY DEVICE FOR INSTRUMENTS WITH IMPROVED ILLUMINATION SYSTEM

BACKGROUND OF THE INVENTION

1. Field of the Invention

The present invention generally relates to a half mirror display device for instruments, and particularly, it relates to a half mirror display device for instruments with an improved illumination system.

2. Description of Relevant Art

FIG. 1 shows a view through a display window of a conventional half mirror display device applied to an instrument panel of an automobile, and FIG. 2, a section along line A—A of FIG. 1.

As illustrated in FIG. 1, the display window displays a speedometer 1, a tachometer 3, a fuel gauge 5, a temperature gauge 7 and a shift lever position indicator 9, to an unshown driver or passenger in the automobile.

As shown in FIG. 2, the display window is defined as a front opening of a light shielding, enclosure of a panel structure that comprises a bottom panel 11, a rear panel 25, a top panel 27, unshown lateral panels and necessary support members or elements. The enclosure accommodates therein an optical display system comprising a figure defining system for defining a set of figure elements to be optically observed, a figure illuminating system for illuminating a plurality of figure elements to provide a plurality of corresponding optical monochromatic or multi-chromatic figure elements to be visible, and a semi-transparent mirror member 13 called "half mirror", which is set in an oblique or 45-dgree inclined position relative to a view direction B, with upper and lower edges held by an upper rear support element 13a and a lower front support element 13b, respectively.

The figure defining system comprises a non-transparent background plate 15 formed with a free hole 15a, a needle-shaped light-transmittable pointer 17 rotatable with a support shaft 17a provided through the free hole 15a and engaged with a cotrollable actuator 17b, and a non-transparent design plate 19 provided with various decorative fancy and/or necessary design elements (hereafter collectively "design elements") such as combinations of slits for defining characters, divisions, markings, etc.

The figure illuminating system comprises: a pair of rear cold cathode tubes 29 as a rear light source for indirectly illuminating the pointer 17; a rear light transmitting plate 21 attached to a rear side of the background plate 15 in opposition to the cold cathode tubes 29 and formed with a hole 21a having a circumference tapered to be smaller in diameter at its front end than at its rear end and than the free hole 15a so that the light transmitting plate 21 has about a front end circumference of the tapered hole 21a a peripheral surface region exposed to a base end part of the pointer 17 to be illuminated; a cap 17c for covering the base end part of the pointer 17 and an exposed inner region of the free hole 15a and for defining limits of movement of the pointer 17; a pair of top cold cathode tubes 30 as a top light source for indirectly illuminating the design elements of the design plate 19; and a top light transmitting plate 23 attached to an upper side of the design plate 19 in opposition to the cold cathode tubes 30.

For observation in the view direction B, a luminous image of the pointer 17 Appears as a mobile real image through the half mirror 13, and a set of illuminated images of the design elements of the design plate 19 appears as a set of stationary virtual images on an identical imaginary plane P, as it is reflected on the half mirror 13. The real and virtual images are combined in a spatially overlapping manner, as illustrated in FIG. 1.

The rear light source 29 is dedicated for illumination of the pointer 17. The top light source 30 is dedicated for illumination of the design elements of the design plate There is an everlasting demand for a light weight design.

SUMMARY OF THE INVENTION

The present invention has been achieved with such points in view.

It therefore is an object of the present invention to provide a half mirror display device for instruments with an improved illumination system permitting a light weighted design as well as a reduced number of components and a reduced cost.

To achieve the object, a first aspect of the invention provides a half mirror display device (FIGS. 3–4) for instruments, comprising: a figure defining system (39, 43, 46, 57) for defining a first figure (e.g. a pointer 43 on a background plate 39) and a second figure (e.g. a character plate 46 with characters and divisions); a figure illuminating system (39a, 43a, 47, 49, 55a, 51, 53, 59) including a first light transmitting plate (47) for illuminating a figure element (e.g. 43) of the first figure to be visible, the first light transmitting plate extending along a first plane (e.g. backside of 39), a second light transmitting plate (49) for illuminating a figure element (e.g. a character or a division) of the second figure to be visible, the second light transmitting plate (49) extending along a second plane (e.g. upside of 46) crossing the first plane, and a light source (51) disposed in an installation space partially defined by an end face of the first light transmitting plate and an end face of the second light transmitting plate; and a half mirror (41) arranged between the first and second planes for displaying a combination of an optical image of the first figure, as it is transmitted through the half mirror, and an optical image of the second figure, as it is reflected on the half mirror, to have images of the figure elements combined to be visible in a display field (33).

According to the first aspect, a light source radiates rays of light, which are transmitted on the one hand through a first light transmitting plate for illuminating a figure element of a first figure to be visible, and on the other hand through a second light transmitting plate for illuminating a figure element of a second figure to be visible. The first figure containing the visible figure element therein may have substantially invisible figure elements, however an optical image of its entirety is transmitted through a half mirror. The second image containing the visible figure element therein may also have substantially invisible figure elements, but an optical image of its entirety is reflected on the half mirror. The transmitted optical image and the reflected optical image are combined so that real and virtual images of the respective visible figure elements are combined to be visible in an identical display field, where they are contrasted over a background that may be substantially invisible. The figure element of the first figure may be a pointer or any physical existence else, and that of the second figure may be a character or division or any physical existence else. The first and/or second figure element(s) may be mobile or stationary, monochromatic or multi-chromatic, and solid, liquid, gaseous or optic, but necessarily has a defined illuminative figure.

Accordingly, the light source is permitted to be common for illumination of any and all associated figure elements.

According to a second aspect (FIG. 3) of the invention, the figure illuminating system further comprises a first reflection film (53) for reflecting rays of incident light thereto from the light source (51) toward the end faces of the first and second light transmitting plates (47, 49).

According to the second aspect, the first and second light transmitting plates each have an increased flux of light incident thereto, with an increased intensity.

According to a third aspect (FIG. 3) of the invention, the first reflection film (53) comprises a pair of flat reflection parts parallel either to both the end faces of the first and second light transmitting plates.

According to the third aspect, those rays of light entering the end faces of the first and second light transmitting plates have an increased tendency to be dense and even between the end faces as well as over each end face, permitting an increased flexibility in design of the light transmitting plates, particularly of thickness and material selection. Flat is not parabolic. The fabrication of film also is easy.

According to a fourth aspect (FIG. 4) of the invention, the figure illuminating system further comprises a second reflection film (59) for preventing rays of incident light thereto from entering one of a peripheral region of the end face of the first light transmitting plate, a peripheral region of the end face of the second light transmitting plate, and a gap between the peripheral regions.

According to the fourth aspect, those rays of light entering the end face of the first and/or second light transmitting plate(s) have an increased tendency to be parallel, permitting an increased flexibility in design of light transmitting route.

According to a fifth aspect (FIG. 4) of the invention, the first and second reflection films define a pair of light paths for guiding a total of radiated light from the light source to the end faces of the first and second light transmitting plates.

According to the fifth aspect, as the reflection films reflect incident light thereto, a total of radiated light is wholly guided, without a remarkable loss that otherwise might occur. In other words, the light source is not in surfacial contact with, but is totally enclosed between the first and second reflection films.

According to a sixth aspect (FIGS. 3–4) of the invention, the half mirror display system further comprises a light-shielding enclosure (31, 35, 35a, 37) for enclosing the figure illuminating system, the light-shielding enclosure having a maintenance cover (35a) removable for a direct access to the installation space.

According to the sixth aspect, a maintenance cover is removable for replacement of the light source. The light-shielding enclose may accommodate an entirety of an optical display system comprised of the figure defining system, the figure illuminating system and the half mirror.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
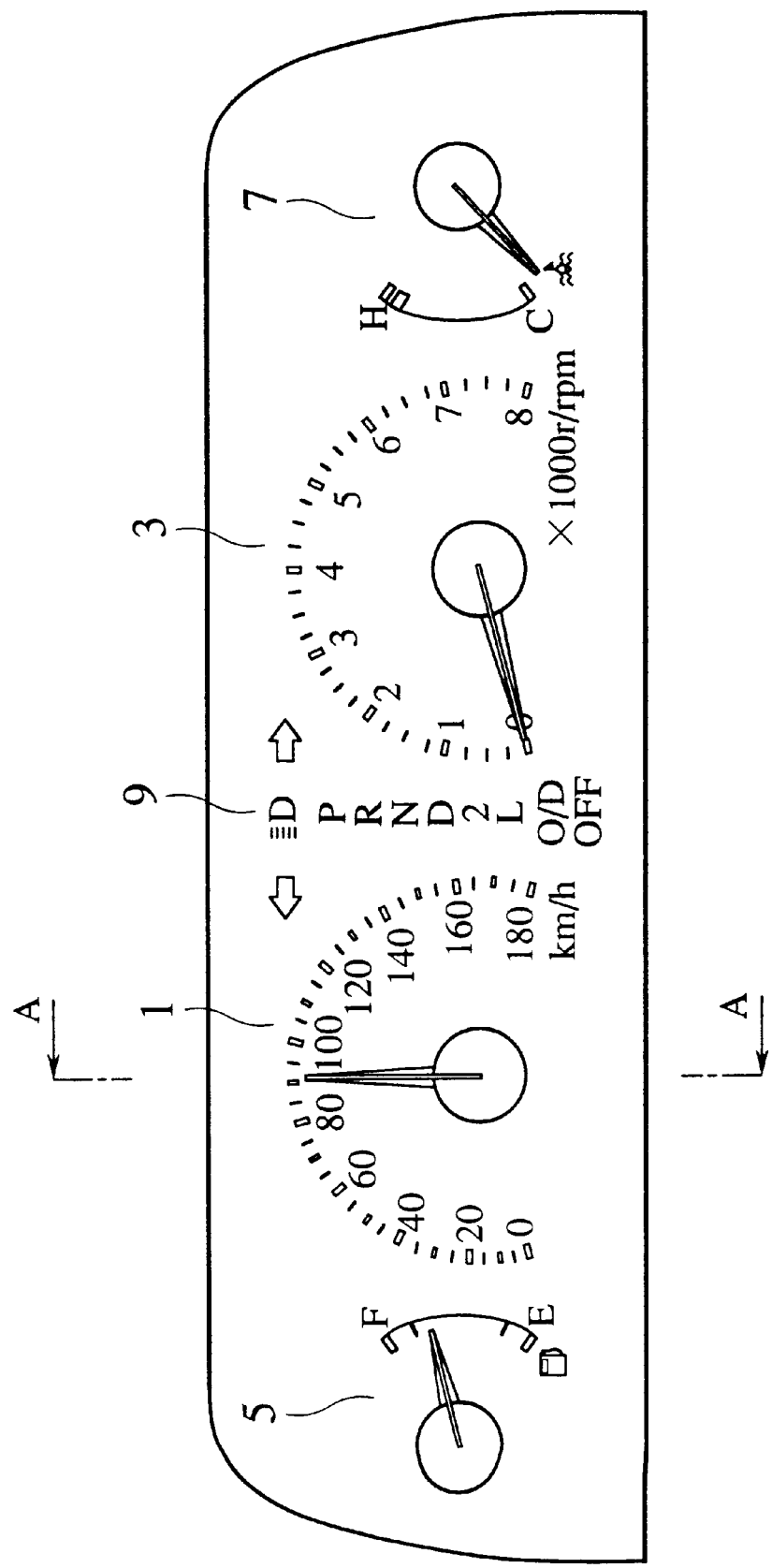
FIG. 1 is a front view of a conventional half mirror display device.
Figure 2:
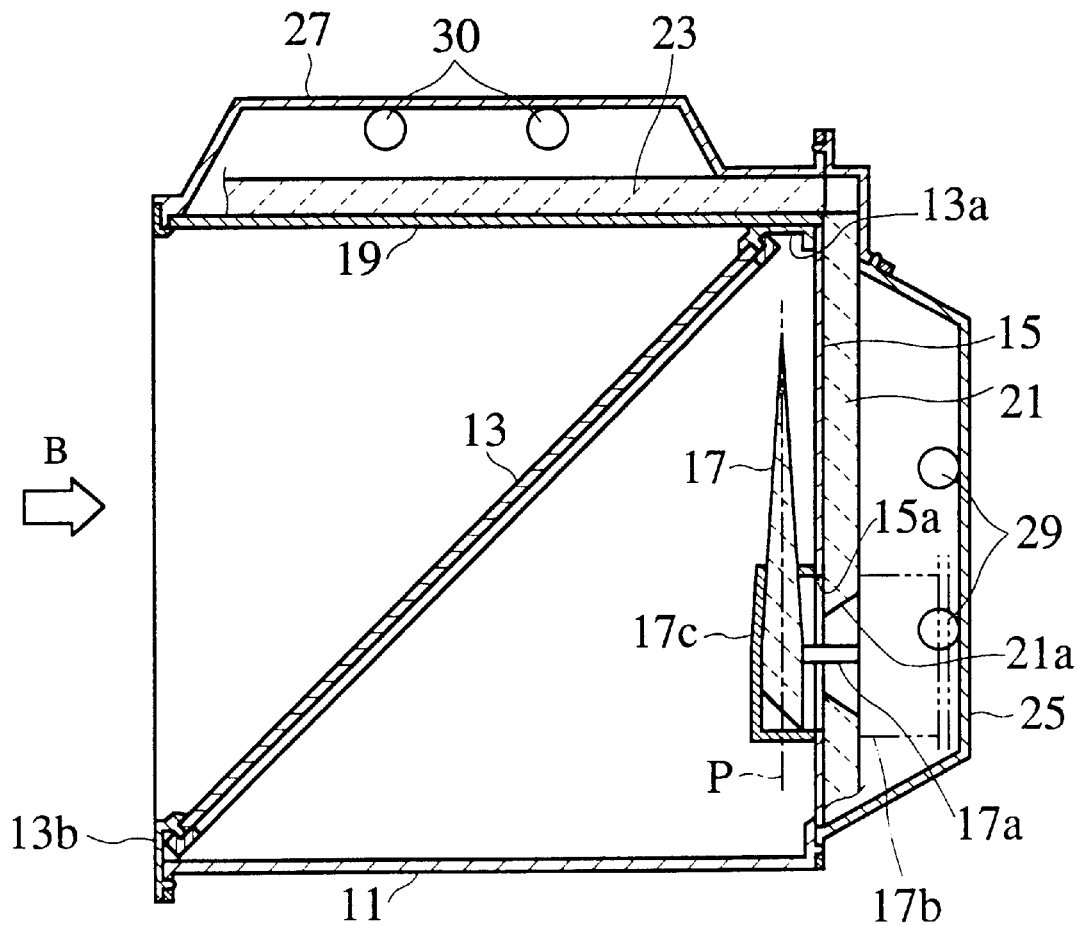
FIG. 2 is a section along line A—A of FIG. 1.

There will be detailed below the preferred embodiments of the present invention with reference to the accompanying drawings. Like members are designated by like reference characters.

Figure 3:
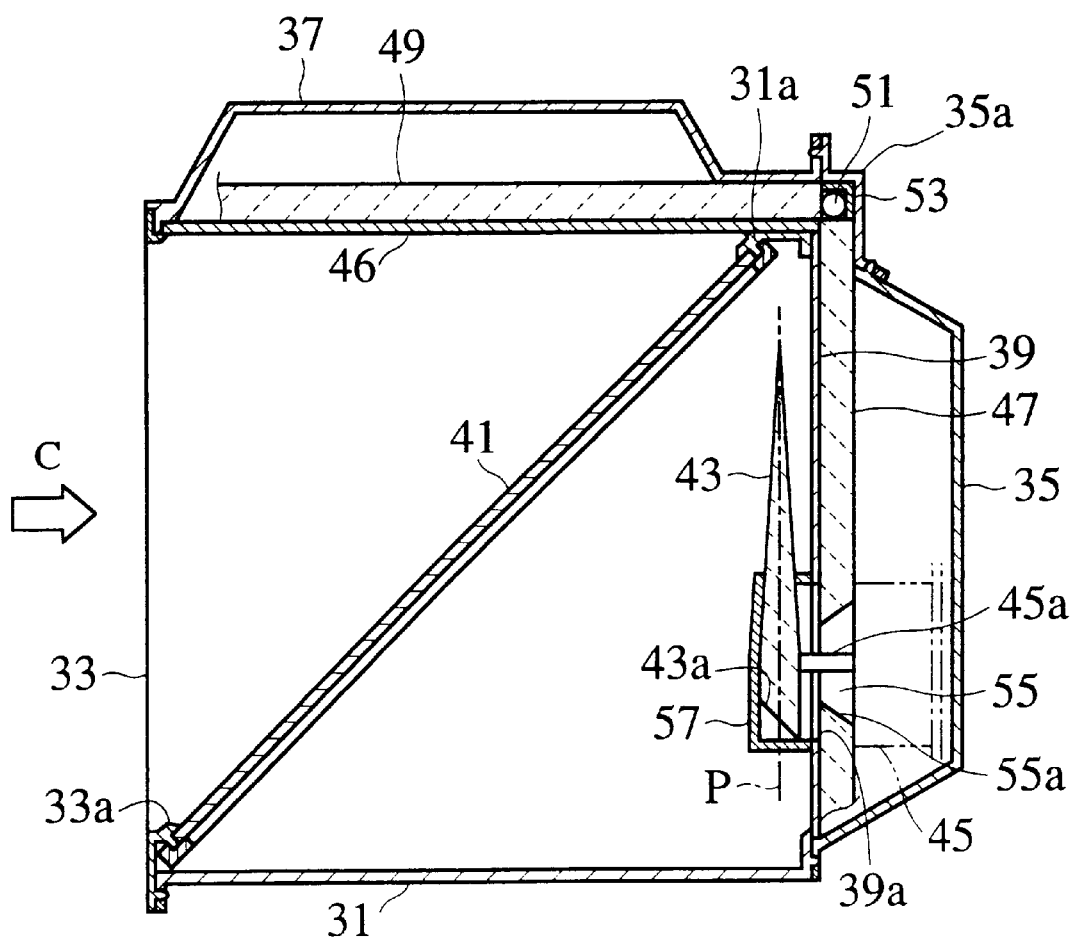
FIG. 3 is a section of a half mirror display device according to an embodiment of the invention.

FIG. 3 shows a half mirror display device according to a first embodiment of the invention.

The half mirror display device is applied to a speedometer section of an image combination type instrument panel (like FIG. 1) of an automobile, and has a view direction C in which a driver should preferably look a display window 33 defined as a front opening of a light shielding enclosure of the device.

The light-shielding enclosure is of a panel structure that comprises a bottom panel 31, a rear panel 35, a top panel 37, unshown lateral panels and necessary support members or elements.

The enclosure accommodates therein an optical display system comprising: a figure defining system for defining a set of figure elements to be visible or substantially invisible when observed, as they constitute figures to be displayed; a figure illuminating system for illuminating the visible figure elements to be contrasted over the invisible figure elements; and a semi-transparent half mirror 41.

The half mirror 41 is set in an oblique or 45-dgree inclined position relative to the view direction C, with upper and lower edges held by an upper rear support element 31a fixed to a rigid frame of the enclosure and a lower front support element 33a fixed to a wind frame of the enclosure, respectively.

The half mirror 41 has at an observation or front side thereof an exposed reflection layer for reflecting rays of incident light thereto, and at an opposite or rear side thereof a hidden transmission layer for transmitting rays of incident light thereto.

The figure defining system comprises a vertical inner wall member 39 standing behind the half mirror 41, a needle-shaped light-transmittable pointer 43 rotatable with a horizontal support shaft 45a (i.e. at a far end thereof in the view direction C with respect to the driver's eyes), and a horizontal character plate 46 extending over the half mirror 41 (at a far end thereof in a reflected direction of a view line of the driver).

The shaft 45a of the pointer 43 is provided through the free hole 39a and engaged with an internal drive 45 as a controllable actuator.

The inner wall member 39 is a dark colored non-transparent background plate which is formed with a free hole 39a.

The character plate 46 is a dark-colored non-transparent design plate provided with various design elements such as characters, divisions, markings, etc in the form of slits or bodies of a luminescent or light-transmittable material.

The background plate 39 is fixed to the enclosure, and has an upper edge abutting on an underside of a right edge of the design plate 46. The design plate 46 also is fixed to the enclosure, at the right edge to the upper rear support element 31a and at a left edge in between the top panel 37 and the window frame, and has a right end face flush with a backside of the background plate 39.

It will be seen that the pointer 43 is a mobile figure element, and the plates 39, 46 are light shielding members of the enclosure as substantially (not completely) invisible or background figure elements provided with mobile and stationary visible figure elements. Visible figure elements may preferably be distributed over an entire invisible region. The plate 39 may also be formed with some design elements such as slits or bodies of a luminescent or light-transmittable material.

The figure illuminating system comprises a rear light transmitting plate 47 attached to a rear side of the background plate 39, a cap 57 for covering a base part of the pointer 43, a top light transmitting plate 49 attached to an upside of the design plate 46, a single cold cathode tube 51 disposed in a corner chamber, and a rear or outer reflection film 53.

The rear light transmitting plate 47 is set in position to have a horizontal upper end face rushed with the upside of the design plate 46.

The light transmitting plate 47 is formed with a rearwardly diameter-enlarged conical hole 55 having a circumference as a reflection wall 55a tapered to be smaller in diameter at its front end than the free hole 39a so that the light transmitting plate 47 has about a front end circumference of the conical hole 55 a peripheral surface region exposed to and adapted for spatial light transmission to a base end part of the pointer 43. The base end part of pointer 43 is formed with a tapered reflection wall 43a for reflecting transmitted light toward a distal end to thereby illuminate an entirety of the pointer 43.

The cap 57 is wide enough to cover an exposed inner region of the free hole 55, and is configured to provide limits to movement of the pointer 43.

The top light transmitting plate 49 is set in position to have a vertical rear end face flushed with the backside of the background plate 39.

The cold cathode tube 51 is disposed in a corner chamber as an installation space defined by the upper end face of the rear light transmitting plate 47 and the rear end face of the top light transmitting plate 49. The cold cathode tube 51 serves as a common light source for indirectly illuminating the pointer 43 and other design elements, permitting a decreased number of components, a simplified structure and a reduced cost.

The reflection film 53 is a silver vapor deposit film or white colored film extending along an inner wall of a rectangular bent maintenance cover 35a. The cover 35a interconnects a rear edge of the top panel 37 and an upper edge of the rear panel 35 with each other, defining remaining sides of the corner chamber.

The reflection film 53 comprises a horizontal flat reflection part for reflecting rays of incident light from the cold cathode tube 51 toward the upper end face of the rear light transmitting plate 47, and a vertical flat reflection part for reflecting rays of incident light thereto from the cathode tube 51 toward the rear end face of the top light transmitting plate 49. The horizontal reflection part covers, or abuts at a front edge thereof on, an upper peripheral region of the rear end face of light transmitting plate 49. The vertical reflection part covers, or abuts at a lower edge thereof on, a rear peripheral region of the upper end face of light transmitting plate 47. Each flat reflection part may be modified to have rays of reflected light wholly parallel.

The maintenance cover 35a is removable to permit a direct access to the corner chamber for maintenance services, such as a cleaning to the reflection film 51 or replacement of the tube 51.

For observation in the view direction C, there is seen a combination of a luminous image of the pointer 43 appearing as a mobile real image through the half mirror 14 and a set of illuminated images of the design elements of the design plate 46 appearing as a set of stationary virtual images on an identical imaginary plane P, as it is reflected on the half mirror 41. The real and virtual images are combined in a spatially overlapped or superposed manner to provide a well defined stereoscopic image.

The figure illuminating system, as well as its components associated with the corner chamber, may be dedicated for the speedometer section of the instrument panel or elongated to be common to a voluntary number of instrument sections.

Figure 4:
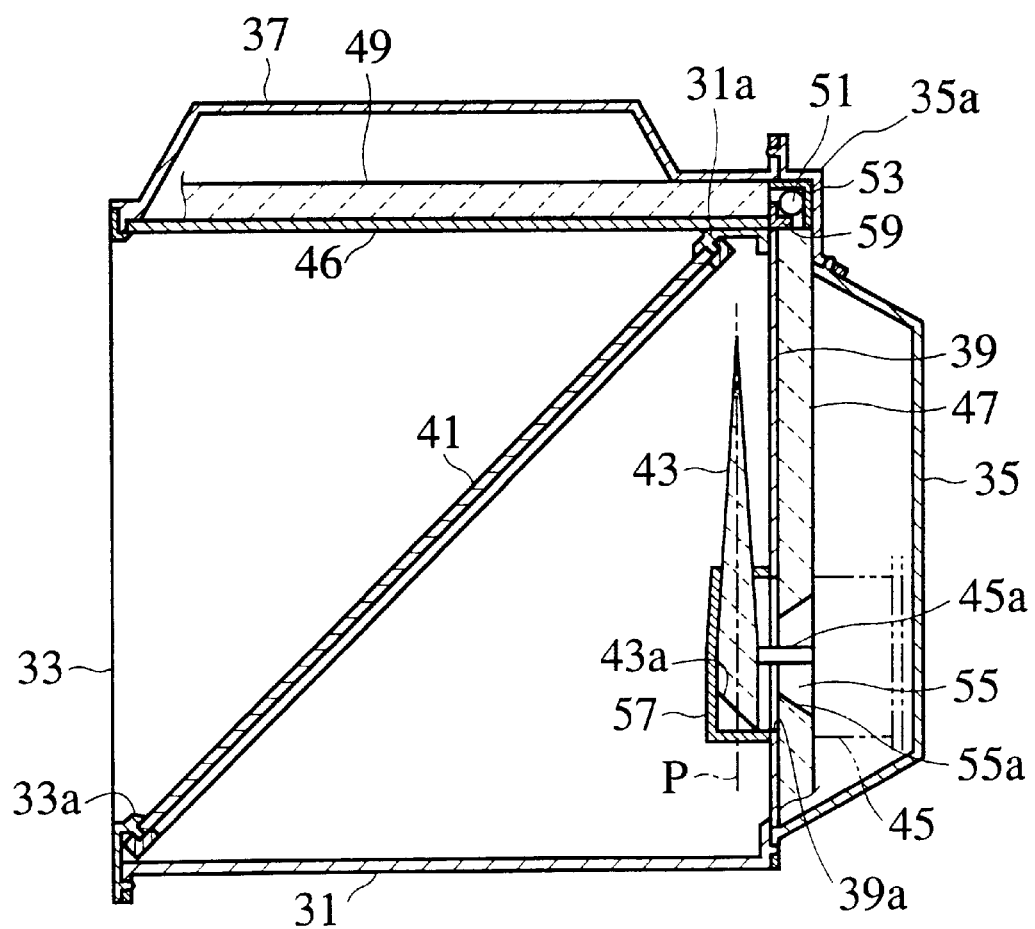
FIG. 4 is a section of a half mirror display device according to another embodiment of the invention.

FIG. 4 shows a half mirror display device according to a second embodiment of the invention, which is different from the first embodiment in that the figure illuminating system further comprises a front or inner reflection film 59 disposed in opposition to a rear or outer reflection film 53, with a common cold cathode tube 51 interposed therebetween.

The inner reflection film 59 comprises a relatively short horizontal flat reflection part abutting at an underside thereof on a front peripheral region of an upper end face of a rear light transmitting plate 47, and a relatively short vertical flat reflection part abutting at a front side thereof on a lower peripheral region of a rear end face of a top light transmitting plate 49.

The inner and outer reflection films 59, 53 cooperate with each other to define a pair of light paths for guiding a total of radiated light from the cold cathode tube 51 to the end faces of the rear and top light transmitting plates 47, 49.

As the inner and outer reflection films 59, 53 reflect incident light thereto, a total of radiated light from the tube 51 is wholly guided, without a remarkable loss.

Therefore, the upper end face of rear light transmitting plate 47 and the rear end face of top light transmitting plate 49 receive flux of light with increased intensities, respectively, permitting a combination of a defined real image of a pointer 43 and defined virtual images of characters and divisions to be visible with a better contrast in a display filed 33.

Moreover, the reflection film 59 prevents rays of incident light thereto from entering the front peripheral region of the end face of light transmitting plate 47, the lower peripheral region of the rear end face of light transmitting plate 49, and a gap between the peripheral regions.

Accordingly, those rays of light entering an exposed region of the end face of each light transmitting plate 47, 49 have an increased tendency to be parallel, permitting an increased flexibility in design of light transmitting route.

While preferred embodiments of the present invention have been described using specific terms, such description is for illustrative purposes, and it is to be undertood that changes and variations may be made without departing from the spirit or scope of the following claims.

What is claimed is:

1. A half mirror display device for instruments, comprising:
   a figure defining system for defining a first figure and a second figure;
   a figure illuminating system including
      a first light transmitting plate for illuminating a figure element of the first figure to be visible, the first light transmitting plate extending along a first plane,
      a second light transmitting plate for illuminating a figure element of the second figure to be visible, the second light transmitting plate extending along a second plane crossing the first plane, and a light source disposed in an installation space partially defined by an end face of the first light transmitting plate and an end face of the second light transmitting plate; and a half mirror arranged between the first and second planes for displaying a combination of an optical image of the first figure, as it is transmitted through the half mirror, and an optical image of the second figure, as it is reflected on the half mirror, to have images of the figure elements combined to be visible in a display field.

2. A half mirror display device according to claim 1, wherein the figure illuminating system further comprises a first reflection film for reflecting rays of incident light thereto from the light source toward the end faces of the first and second light transmitting plates.

3. A half mirror display device according to claim 2, wherein the first reflection film comprises a pair of flat reflection parts parallel either to both the end faces of the first and second light transmitting plates.

4. A half mirror display device according to claim 2, wherein the figure illuminating system further comprises a second reflection film for preventing rays of incident light thereto from entering one of a peripheral region of the end face of the first light transmitting plate, a peripheral region of the end face of the second light transmitting plate, and a gap between the peripheral regions.

5. A half mirror display device according to claim 4, wherein the first and second reflection films define a pair of light paths for guiding a total of radiated light from the light source to the end faces of the first and second light transmitting plates.

6. A half mirror display device according to claim 1, further comprising a light-shielding enclosure for enclosing the figure illuminating system, the light-shielding enclosure having a maintenance cover removable for a direct access to the installation space.

* * * * *

UNITED STATES PATENT AND TRADEMARK OFFICE
CERTIFICATE OF CORRECTION

PATENT NO. : 5,938,311

DATED : AUGUST 17, 1999

INVENTOR(S): Kouichi TAKAO, et al.

It is certified that an error appears in the above-identified patent and that said Letters Patent is hereby corrected as shown below:

Column 1, line 34, change "45-dgree" to --45-degree --; and line 66, change "Appears" to --appears--.

Column 2, line 8, after "of the design plate", insert --19.--.

Signed and Sealed this

Twenty-fourth Day of October, 2000

Attest:

Q. TODD DICKINSON

*Attesting Officer*   *Director of Patents and Trademarks*